D. DELLA TORRE.
CANDY TWISTING MACHINE.
APPLICATION FILED MAY 10, 1916.
1,218,340.
Patented Mar. 6, 1917.
2 SHEETS—SHEET 1.
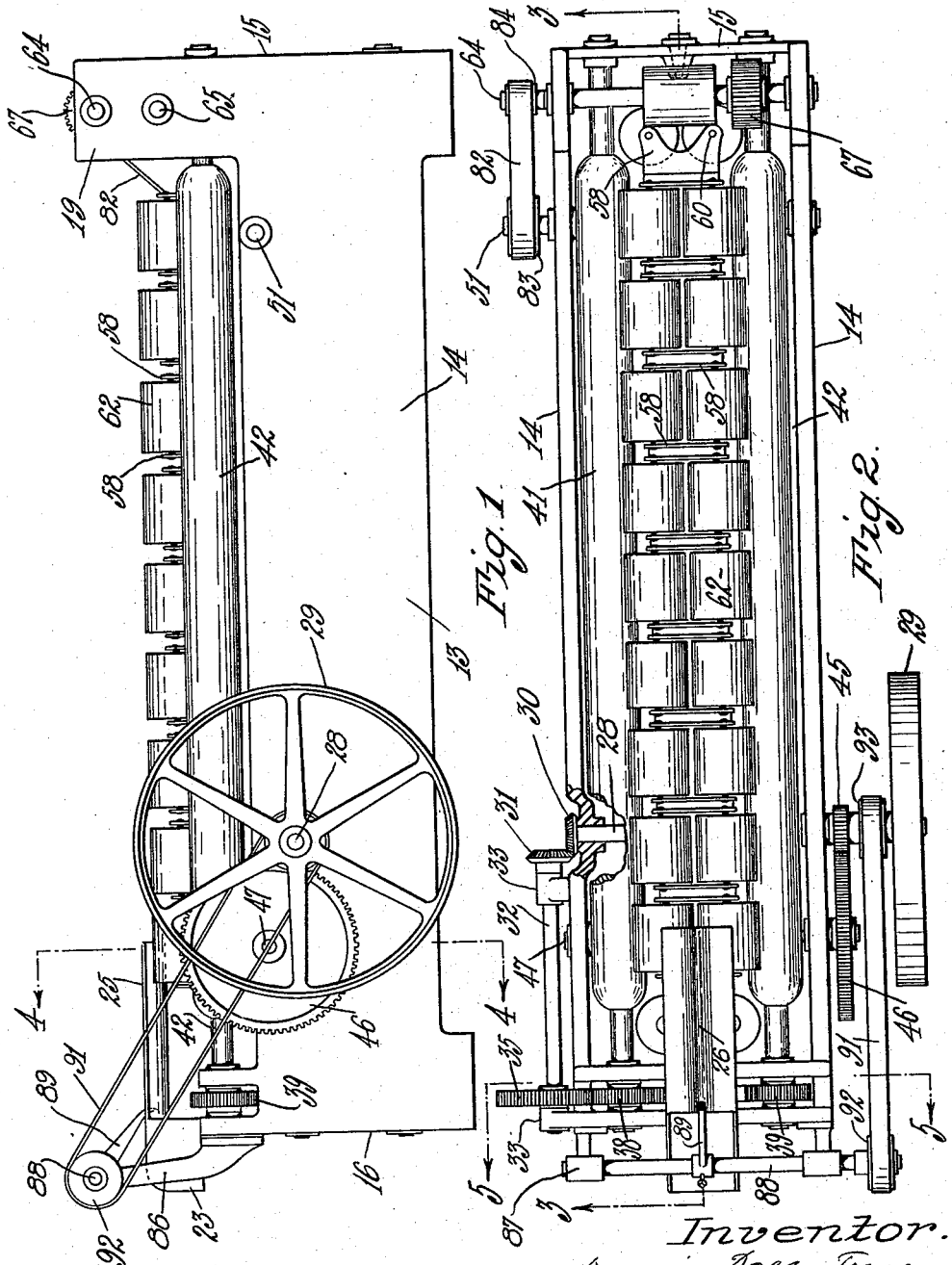
Inventor.
Domenico Della Torre
By Horatio E. Bellows
Attorney.

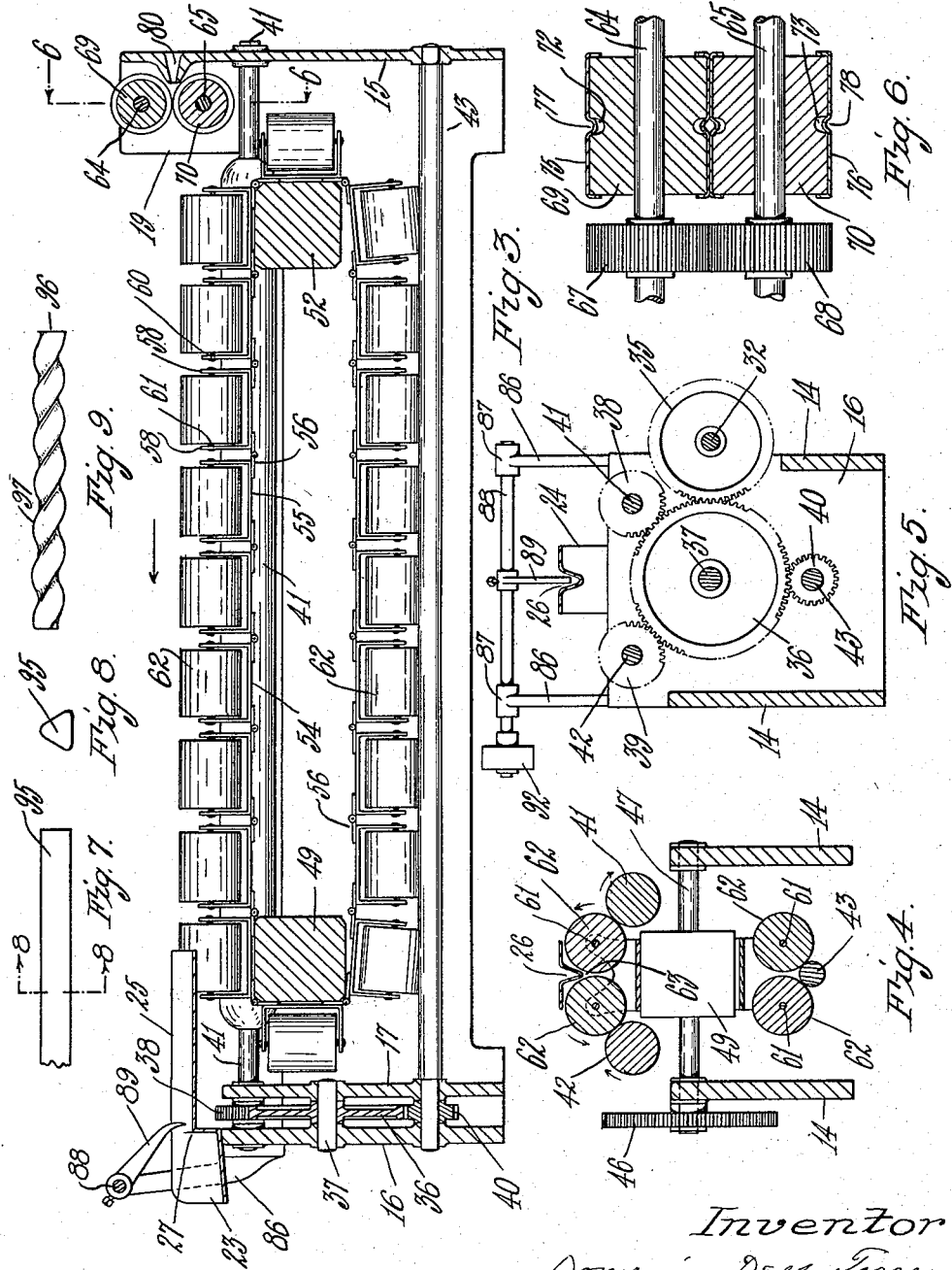

UNITED STATES PATENT OFFICE.

DOMENICO DELLA TORRE, OF PROVIDENCE, RHODE ISLAND, ASSIGNOR TO THE ANDERSON CANDY COMPANY, A CORPORATION OF RHODE ISLAND.

CANDY-TWISTING MACHINE.

1,218,340.  Specification of Letters Patent.  Patented Mar. 6, 1917.

Application filed May 10, 1916. Serial No. 96,467.

*To all whom it may concern:*

Be it known that I, DOMENICO DELLA TORRE, a subject of the King of Italy, residing at Providence, in the county of Providence and State of Rhode Island, have invented certain new and useful Improvements in Candy-Twisting Machines, of which the following is a specification.

My invention relates to a machine adapted to twist a length of plastic candy into spiral form.

The essential objects of my invention are to automatically twist the candy strip; to impart a spiral form thereto; to insure a uniform outline and length in the product; to effect these ends by a simple mechanism; and to twist a strip of small cross-section, a result which has heretofore been attained only by manual manipulation whereby a maximum labor expense has been involved.

To the above and other ends herein set forth, my invention primarily consists in such parts and combinations of parts as fall within the scope of the appended claims.

In the accompanying drawings which form a part of this specification,

Figures 1 and 2 are side and plan elevations respectively of a machine embodying my invention, Fig. 3, a longitudinal section of the same on line 3—3 of Fig. 2, Figs. 4 and 5, transverse sections of the same on lines 4—4 and 5—5 of Figs. 1 and 2 respectively, Fig. 6, a section of the feed rolls on line 6—6 of Fig. 3, Figs. 7 and 8, side and end elevations respectively of the forward end portion of a length of candy before feeding to the machine, and Fig. 9, a side elevation of a length of candy after passing through the machine.

Like reference characters indicate like parts throughout the views.

The casing or framework of my machine may be any form best suited to carry the operative parts. In the present instance it consists of an oblong rectangular frame or casing 13 comprising side walls 14, and forward and rear end walls 15 and 16, together with a second rear end wall 17 adjacent the first. A support 19 on the forward end of the casing is formed by the vertical extension of the side wall and the forward end wall. Fixed to the top of the rear wall 16 centrally thereof is a trough 23 comprising a rectangular body portion 24, and an extended portion 25 projecting from the upper part of the body portion provided with a longitudinal groove 26, and forming in conjunction with the body portion a resultant shoulder 27.

Journaled in the side walls is the driving shaft 28 whose pulley 29 is driven from any convenient source of power. Upon the end of this shaft is a beveled pinion 30 meshing with a beveled pinion 31 on the end of a shaft 32 mounted in brackets 33 fixed to the exterior of one of the side walls. On this shaft is a gear 35 meshing with an idler gear 36 loose on a stud 37 in the rear walls. The idler engages pinions 38, 39, and 40 fast on the rotary rods or rolls 41, 42, and 43 respectively journaled in the end pieces of the frame. The rods 38 and 39 are in the same horizontal plane in the upper part of the frame, and the rod 43 is intermediate the same in a lower plane.

A pinion 45 on the driving shaft engages a gear 46 fast on a shaft 47 mounted in the side walls of the frame near the rear of the frame. On the shaft 47 is a block or sprocket wheel 49 having a polygonal periphery, in the present instance four faces. Journaled in the side walls near the other end of the frame is another shaft 51 fast to which is a block or sprocket wheel 52 similar in shape to the member 49 and horizontal in alinement therewith. Embracing the members 49 and 52 is an endless member or chain indicated in a general way by the reference numeral 54. In detail this member comprises a series of flat plates 55 connected to each other by hinges 56. Upon opposite ends of each plate are lugs 58, each provided with two perforations 60 to receive the shafts or pintles 61 of rollers 62, preferably of wood. Thus there are two rollers on each plate arranged side by side nearly in contact with each other, and disposed longitudinally of the plate and of the entire member 54, so as to form with their adjacent sides a resultant trough 63. The length of each plate corresponds with the width of each operating face of the members 49 and 52, and the latter member is driven from the former through the chain 54.

Mounted one above the other in the extension 19 are shafts 64 and 65 provided near one end by the intermeshing gears 67 and 68 respectively. Fast to these shafts in longitudinal alinement with the rollers, but elevated slightly with relation thereto are the feed rolls 69 and 70 respectively, provided with centrally located annular peripheral grooves 72 and 73. Fixed to the perihperies of the feed rolls are sleeves 75 and 76 of canvas or similar rough, pliable, or textile material, so attached as to leave annular loops or grooves 77 and 78 within the grooves 72 and 73 so as to form a comparatively yielding surface to material passing between the rolls. The grooves are in longitudinal alinement with the converging faces of the rollers 62 or the trough 63, so that a strip of candy pulled by the feed rolls through a guide opening 80 in the end wall of the frame would naturally drop into and rest in the trough. These feed rolls are driven by a belt 82 connecting a pulley 83, on the shaft 51, with a wheel 84 fast on the projecting end of the shaft 64.

Upon this rear wall 16 are fixed vertical arms 86 in which are bearings 87 for a transverse shaft 88 having fast thereto a finger 89 whose end nearly contacts in its rotation with the shoulder 27 of the trough 23 within the groove 26. The shaft 88 is rotated by a belt 91 connecting a wheel 92 on said shaft with a wheel 93 fast on the shaft 28.

The endless chain member 54 is driven by the main shaft 28 through the gears 45 and 46 and shaft 47, whereby the said member is driven in the direction of the arrow shown in Fig. 3. Meanwhile, the two series of rollers 62 are being turned by the rotary rods 41 and 42 which are in frictional contact with the series of rollers on each side therewith. These rods are driven by the main shaft of through pinions 30, 31, shaft 32, and gears 35 and 36. It will be noted that the rods or rolls 41 and 42 rotate in the same direction, and as a result both rows of rollers 62 rotate in a direction similar with relation to each other, but opposite to the direction of the rods, as indicated by the arrows in Fig. 4.

The rod 43 tends to form a support for the rollers in their lower positions and contacts therewith between the rows. While this rod prevents any excessive sag of the endless member its presence is not imperative to successful operation of the mechanism.

In using the machine a batch of candy is prepared and stretched into a long strip 95, a short portion of which strip is shown in Fig. 7. In cross-section the strip may be of any form. In this case it is substantially triangular, therefore after passing through the machine the complete section 96 is convoluted, having spiral shoulders 97, as shown in Fig. 9. The plastic strip is inserted through the guide 80 between the feed rolls 69 and 70 and sustained by gravity in the resultant trough between the roller surfaces. There is some slight adherence to these surfaces due to the composition and consistency of the plastic or yielding strip. The described transverse rotation of the rollers imparts a uniform twist to the strip throughout its length, while their longitudinal advance, by reason of the chain, coöperates with the feed rolls 69 and 70 to move the strip uniformly through the machine without strain upon the material being operated on. The rough and yielding character of grooves 77 and 78 facilitates the engagement of the rolls with the strip, whatever cross-sectional contour the strip may originally have had imparted to it prior to insertion between the rolls. The twisted strip in its advance moves through the groove 26 in the trough extension 25, and the cutter or breaker member 89, once in each of its revolutions, coöperates with the shoulder 27 to sever a twisted stick 96 from the strip, and this stick is the completed article.

I claim:—

1. In a machine for forming stick candy, the combination of a series of twisting rollers arranged in pairs with their peripheries in parallelism with each other to form a peripheral trough adapted to receive a strip of candy, and means for imparting rotary motion in the same direction to all of the rollers.

2. In a machine for forming stick candy, the combination of pairs of twisting rollers arranged in series and rotatable in the same direction, traveling means for carrying the rollers, and means for feeding a strip of candy to the rollers.

3. In a machine for forming stick candy, the combination of series of rollers arranged in pairs and rectilinearly movable transversely to the direction of their rotation, and driving rolls in frictional engagement with the peripheries of the rollers.

4. In a machine for forming stick candy, the combination of a conveyer, and means for driving the same, of a plurality of rollers mounted on the conveyer with their peripheries disposed lengthwise of the chain to form a peripheral trough, feed rolls adjacent the conveyer adapted to deliver a strip of candy to the rollers, friction rolls engaging the rollers, and means actuating the friction rolls for operating the feed rolls.

5. In a machine for forming stick candy, the combination of a conveyer, series of rollers on the conveyer arranged longitudinally thereof with their peripheries disposed to form a trough and adapted to support a strip of candy, a delivery guide adjacent one end of the member, a shoulder on the guide, a rotary blade adapted in its travel to coöperate with the shoulder to divide the strip, and means actuating the conveyer for operating the blade.

6. In a machine for forming stick candy, the combination of sprocket wheels, a conveyer on the wheels comprising plates pivotally connected with each other, lugs upon the ends of the plates, and rollers mounted side by side in the lugs longitudinally of the conveyer, and means for actuating the wheels.

7. In a machine for forming stick candy, the combination of sprocket wheels provided with plane peripheral faces, a conveyer on the wheels comprising flat plates adapted to engage the faces of the wheels, hinges connecting the plates, lugs on the plates, and rollers arranged lengthwise of the conveyer disposed in pairs in the lugs, and means for driving the wheels.

8. In a machine for forming stick candy, the combination with a conveyer for moving a strip of candy, of feed rolls for the strip mounted adjacent the carrier comprising cylindrical bodies provided with annular grooves in alinement with each other, and sleeves upon the bodies provided with loops within the grooves, and means for operating the rolls.

9. In a machine for forming stick candy, the combination with the conveyer for moving a strip of candy, of feed rolls for the strip mounted adjacent the carrier comprising bodies provided with peripheral grooves in alinement with each other, and rough sleeves surrounding the rolls and provided with yielding portions extending into the grooves, and means for operating the rolls.

In testimony whereof I have affixed my signature.

DOMENICO DELLA TORRE.

Copies of this patent may be obtained for five cents each, by addressing the "Commissioner of Patents, Washington, D. C."